(12) United States Patent  (10) Patent No.: US 6,324,920 B1
DeSchrijver  (45) Date of Patent: Dec. 4, 2001

(54) SYSTEM AND METHODS FOR MEASURING FORCES

(76) Inventor: Stefaan DeSchrijver, 952 Beacon St., Newton, MA (US) 02159

( * ) Notice: Subject to any disclaimer, the term of this patent is extended or adjusted under 35 U.S.C. 154(b) by 0 days.

(21) Appl. No.: 09/344,533

(22) Filed: Jun. 25, 1999

Related U.S. Application Data (60) Provisional application No. 60/090,806, filed on Jun. 26, 1998, and provisional application No. 60/090,866, filed on Jun. 26, 1998.

(51) Int. Cl.$^7$ ....................................................... G01D 7/00
(52) U.S. Cl. ....................................................... 73/862.046
(58) Field of Search ........................ 73/777, 763, 862.68, 73/862.046

(56) References Cited

U.S. PATENT DOCUMENTS

| | | | |
|---|---|---|---|
| 3,725,298 | 4/1973 | Woodhead et al. | 252/317 |
| 4,152,281 | 5/1979 | Arendt et al. | 252/62.9 |
| 4,460,842 * | 7/1984 | Waanders et al. | 310/338 |
| 4,491,759 * | 1/1985 | Kunz et al. | 310/328 |
| 4,592,727 * | 6/1986 | Bloomfield | 433/71 |
| 5,345,428 * | 9/1994 | Arnold et al. | 367/165 |
| 5,527,480 | 6/1996 | Bailey et al. | 252/62.9 |
| 5,548,092 | 8/1996 | Shriver | 178/18 |
| 5,702,629 | 12/1997 | Cui et al. | 252/62.9 R |
| 5,728,937 * | 3/1998 | Reichau et al. | 73/579 |

FOREIGN PATENT DOCUMENTS

| | | |
|---|---|---|
| 42 22 990 A | 10/1993 | (DE) . |
| 0 270 693 A | 6/1988 | (EP) . |
| 0316 498 A | 5/1989 | (EP) . |
| 62153766 A | 8/1987 | (JP) . |
| 08005653 | 12/1996 | (JP) . |

* cited by examiner

*Primary Examiner*—Max Noori
(74) *Attorney, Agent, or Firm*—Ropes & Gray (57) ABSTRACT

The systems and methods disclosed herein relate to sensor/actuator devices capable of detecting and generating forces, for example, substantially simultaneously. The disclosed piezoelectric devices are capable of operating in multiple dimensions. In certain embodiments, the devices are incorporated into systems for monitoring the motion of an apparatus, such as a stylus, or for monitoring forces acting on an apparatus, such as an airplane. The detected forces may be used to reconstruct the motion of the apparatus, for recognizing handwriting, or for a variety of other purposes. The systems may further be used as actuators, for example, for controlling an apparatus or deforming a surface.

15 Claims, 8 Drawing Sheets

SYSTEM AND METHODS FOR MEASURING FORCES

RELATED APPLICATION

This application claims priority to U.S. Provisional Application No. 60/090,806, entitled "Apparatus and Methods for Reconstructing the Dynamics of Motion" and filed Jun. 25, 1998, U.S. Provisional Application No. 60/090,866, entitled "MEMSOR CCU: Micro Electro-Mechanical Sensor and Actuator System Cluster Control Unit" and filed Jun. 25, 1998, and U.S. Provisional Application No. 60/, entitled "Memsor-3DMP: Three axis multipurpose electromechanical sensor and actuator" and filed Jun. 25, 1998, each naming Stefaan Shriver as inventor and all hereby incorporated by reference.

FIELD OF THE INVENTION

The invention relates to sensors and actuators, needed for measuring or causing forces, accelerations and angles or changes thereof, to hardware and software needed to drive such sensors and actuators, and to processes for manufacturing the same.

BACKGROUND OF THE INVENTION

Devices that monitor and visualize information relating to the dynamics of a system detect forces that cause the motion of the system relative to three axes of a reference frame. These forces can be used to recreate the motion of the system, and consequently to render an image of that motion, as a projection in a virtual three-dimensional display space, as a projection or intersection with a two-dimensional plane, or as an oscillation along a single axis. The reconstruction is possible in any environment, whether the system moves in three-dimensional space, on a surface, or along a single line.

How accurately images can be visualized or reconstructed depends on how completely the detected forces describe the motion of the system in its environment. For example, forces applied along more than one axis to a pen point may represent that the pen point moved along a writing surface, or may represent that the pen is being pressed at an angle on a stationary point. Additional information is necessary to distinguish between these situations so that an accurate image can be obtained. Similarly, the motion of the head of a golf club can only be accurately visualized if all forces executed upon it are known, including the torsion and the strain on the shaft of the club caused by inertia of the club head and air resistance. The ability to image dynamic information regarding a system, therefore, is limited by the available information regarding variation of motion and orientation of the components of the system.

In general, devices for imaging information of systems in motion use external reference points to measure position and orientation, at various moments in time. For instance, instruments that measure the position of a satellite measure orientation with respect to the earth's horizon and with respect to a distant star. As another example, pen computers use a tablet to measure the change of position and orientation of a pen point on a writing surface. However, a suitable sensor system can be incorporated into a device in order to measure the forces acting on an object that alter its position or orientation.

Force, like many physical phenomena, cannot be measured without disturbing the phenomenon being measured. Most force transducers have an elastic sensing element, whose deformation is a measure of the acting force. In many force measurement systems, such as strain gauges, inductive, and capacitive systems, this deformation itself must be measured. The sensing element must be compliant enough to provide sufficiently large deformation and hence useful sensitivity. However, large deformations are undesirable because they limit the frequency response of the measuring system and also introduce geometric changes into the force measuring path which inevitably leads to measurement errors.

Piezoelectric materials, which can convert forces into electricity, are useful for detecting forces. In piezoelectric force transducers, the sensing element is the same as the transduction element which produces the electrical output signal from an acting force. Therefore, it is not necessary to measure the deformation, which is typically much smaller than with other measuring systems. The resultant rigidity of piezoelectric force transducers greatly reduces the distortion caused by the measurement and provides an inherently high natural frequency and associated rise time. This permits the measurement of extremely fast events that otherwise might be difficult to discern accurately.

Piezoelectric accelerometers require the addition of an inertial mass to a piezoelectric force transducer. As the mass is accelerated, it exerts a force on the piezoelectric material. Because of the constant inertial mass, the force acting on the measuring element is proportional to the acceleration in accordance with Newton's first law. Thus, the electrical charge generated by the piezoelectric material is proportional to the acceleration.

Piezoelectric components are also capable of converting electricity into force, and thus can be used as actuators. In its simplest form, a piezoelectric actuator abuts against a non-displaceable support and pushes against a displaceable element. When an electric voltage is applied across the piezoelectric element, it expands, displacing the displaceable element. The variations in length tend to be rather small, even when individual piezoelectric elements are arranged in stacks with an overall height of approximately 20 mm. Such arrangements are used as precision drives, for example, in adjustment operations.

However, existing piezoelectric devices are unable to measure forces or accelerations in three axes. What is needed is a device capable of measuring and/or transmitting forces along multiple axes in a sensitive, controlled manner. What is also needed is a device capable of sensitive acceleration measurements in multiple axes. A device that combines sensor and actuator capabilities for sensitive, controlled feedback mechanisms is also needed.

SUMMARY OF THE INVENTION

The systems and methods described herein relate to a sensor/actuator device. In one embodiment, a sensor for detecting forces comprises at least two piezoelectric stacks electrically coupled to a corresponding stack electrode, such that a force applied to the sensor generates a change in electrical potential between each of the stack electrodes and a common ground, which change is representative of a component of the force acting on the corresponding stack. Each stack may include a plurality of piezoelectric layers electrically coupled to the corresponding stack electrode. A sensor with three stacks may be capable of resolving forces in three dimensions. Each stack may further include a plurality of piezoelectric layers electrically coupled to the common ground. In one embodiment, the stacks are encircled by an electrically conductive wire. In another embodiment, the stacks are coupled to at least one inertial mass.

In another embodiment, a sensor for detecting forces has a first plurality of stacked piezoelectric layers, each layer divided into a number of regions, each region electrically insulated from other regions of the same layer and electrically coupled to like regions of other layers by a stack electrode, such that a force applied to the sensor generates a change in electrical potential between each of the stack electrodes and a common ground, which change is representative of a component of the force acting on the corresponding region. Such a sensor may also include a second plurality of stacked piezoelectric layers electrically coupled to the common ground and intermixed with the first plurality of stacked piezoelectric layers. The layers of the second plurality of stacked piezoelectric layers may similarly be divided into a number of regions. Layers of the first plurality and of the second plurality may alternate in series. When the number of regions in the first plurality of stacked piezoelectric layers is three, the sensor may be capable of resolving forces in three dimensions. As described above, the layers may be encircled by an electrically conductive wire. In one embodiment, the layers are coupled to at least one inertial mass. In one embodiment, application of an electrical potential between the common ground and a stack electrode causes deformation of the region electrically coupled thereto.

The systems and methods disclosed herein also provide a system for detecting forces, comprising a housing, two sensors disposed in the housing, each sensor comprising a plurality of stacked piezoelectric layers, each layer divided into a number of regions, each region electrically insulated from other regions of the same layer and electrically coupled to like regions of other layers by a stack electrode, and a divider disposed between the two sensors and coupled to each sensor, wherein a force applied to the divider compresses one sensor and expands the other sensor. The sensors may be aligned so that the stacks are parallel between the two sensors. The sensors may also be aligned so that the regions are aligned between the two sensors.

In another aspect, the systems and methods described herein relate to a system for detecting forces and accelerations, comprising a sensor as described above and a transmitter, electrically coupled to the sensor, to transmit signals generated by the sensor, such that a force applied to the sensor generates a change in electrical potential between each of the stack electrodes and a common ground, which change is representative of a component of the force acting on the corresponding region. The system may also include a receiver to receive the signals from the transmitter, and a processor coupled to the receiver to process the signals. The signals may be representative of the motion of the sensor along three axes. In one embodiment, an inertial mass is coupled to the sensor. Signals generated by such a sensor may be representative of the orientation of the sensor in a gravitational field. The system may also include a temperature sensor.

In another aspect, the systems and methods disclosed herein relate to system for imaging written information, comprising a stylus tip, a first sensor as described above coupled to the stylus tip, a housing coupled to the first sensor, and a first transmitter, electrically coupled to the first sensor, to transmit signals generated by the sensor. The system may also include a second sensor coupled to an inertial mass as described above. In one embodiment, the second sensor is coupled to a second transmitter to transmit signals generated by the second sensor. Alternatively, both sensors may be coupled to the same transmitter. In one embodiment, the system includes a receiver to receive the signals from the first and second transmitters, and a processor electrically coupled to the receiver to process the signals. The processor may be capable of comparing signals generated by the first and second sensors to stored signals. In one embodiment, the processor is capable of recognizing handwriting. In another embodiment, the system may include a receiver to receive the signals from the first and second transmitters, and a storage medium electrically coupled to the receiver for retaining the received signals.

In another aspect, the systems and methods provide a system for dynamic monitoring of an apparatus, comprising a plurality of sensors as described above and a processor coupled to the sensors to process their signals, wherein signals generated by the sensors are representative of forces acting on the apparatus. In one embodiment, the processor is capable of applying a potential to a sensor to deform the sensor. The processor may be capable of being controlled by a user. The apparatus may be an aircraft or a spacecraft.

In another aspect, the systems and methods disclosed herein relate to a method for manufacturing a sensor for detecting forces by providing at least two stacks, each stack having a plurality of piezoelectric layers, electrically coupling a first number of said piezoelectric layers in each stack to a corresponding stack electrode, and electrically coupling a second number of said piezoelectric layers to a common ground. As described previously, the sensor may include three stacks, each having a plurality of piezoelectric layers. The method may also include winding an electrically conductive wire around the stacks. In one embodiment, the method includes coupling the stacks to at least one inertial mass. The layers of the first number may alternate in series with layers of the second number. The method may further include coupling the stack electrodes and the common ground to a detector to measure an electric potential between the stack electrodes and the common ground.

In another embodiment, the systems and methods relate to a method for manufacturing a system for detecting forces by providing a housing, disposing two sensors in the housing, each sensor comprising a plurality of stacked piezoelectric layers, each layer divided into a number of regions, each region electrically insulated from other regions of the same layer and electrically coupled to like regions of other layers by a stack electrode, disposing a displaceable divider between the two sensors, and coupling the divider to each sensor. The sensors may be aligned so that the stacks of piezoelectric layers are aligned in both sensors. The sensors may also be aligned so that the regions are aligned between the two sensors.

In another embodiment, the systems and methods disclose a method for manufacturing a sensor for detecting forces by providing a first plurality of stacked piezoelectric layers, each layer divided into a number of regions, each region electrically insulated from other regions of the same layer and electrically coupled to like regions of other layers by a stack electrode. The method may include providing a second plurality of stacked piezoelectric layers intermixed with the first plurality of stacked piezoelectric layers, each layer electrically coupled to a common ground. The layers of the second plurality of stacked piezoelectric layers may be similarly divided into a number of regions. Layers of the first and second pluralities may alternate in series. In one embodiment, the number of regions in the first plurality of stacked piezoelectric layers is three. The method may also include winding an electrically conductive wire around the layers. In one embodiment, the method includes coupling the layers to at least one inertial mass. The method may also include coupling the stack electrodes and the common ground to a detector to measure an electric potential between the stack electrodes and the common ground.

In another aspect, the systems and methods disclosed herein relate to a method for detecting forces and accelerations by providing a sensor as described above and electrically coupling a transmitter to the sensor to transmit its signals, such that a force applied to the sensor generates a change in electrical potential between each of the stack electrodes and a common ground, which change is representative of a component of the force acting on the corresponding region. The method may include disposing the sensor on a surface. In one embodiment, the method includes providing a receiver to receive the signals from the transmitter, and coupling a processor to the receiver to process the signals. The method may also include coupling an inertial mass to the sensor. In such an embodiment, the signals may be representative of the orientation of the sensor in a gravitational field.

In yet another aspect, the invention provides a method for imaging written information by providing a housing, disposing a first sensor as described above in the housing, coupling a stylus tip to the first sensor, and electrically coupling a first transmitter to the first sensor to transmit signals generated by the first sensor, whereby signals generated by the sensor are useful for imaging written information. The method may further include coupling a second sensor as described above to the housing. The second sensor may be electrically coupled to the first transmitter or to a second transmitter. An inertial mass may be coupled to the second sensor. In one embodiment, the method includes providing a receiver to receive the signals from the first and second transmitters and electrically coupling a processor to the receiver to process the signals. The method may include detecting forces representative of the motion of the stylus tip, and generating signals with the first and second sensors representative of the motion, such as the strokes, of the stylus tip. In another embodiment, the method includes providing a receiver to receive the signals from the first and second transmitters, and providing a storage medium electrically coupled to the receiver to retain the received signals. The method may include comparing signals generated by the first and second sensors to stored signals. In one embodiment, the method includes identifying the signals as representative of a person's handwriting.

In another aspect, the invention provides a method for dynamic monitoring of an apparatus by providing a plurality of sensors as described above, coupling a processor to the sensors to process signals generated thereby, and coupling the sensors to the apparatus, such that signals generated by the sensors are representative of forces acting on the apparatus. The processor may be coupled to the sensors by transceivers. In one embodiment, the processor is capable of applying a potential to a sensor to deform the sensor. The processor may be capable of being controlled by a user. The apparatus may be an aircraft or a spacecraft, for example.

BRIEF DESCRIPTION OF THE ILLUSTRATED EMBODIMENTS

DESCRIPTION OF THE ILLUSTRATED EMBODIMENTS

The description below pertains to several possible embodiments of the invention. It is understood that many variations of the systems and methods described herein may be envisioned by one skilled in the art, and such variations and improvements are intended to fall within the scope of the invention. Accordingly, the invention is not to be limited in any way by the following disclosure of certain illustrative embodiments.

The systems and methods disclosed herein relate to sensor/actuator devices capable of operating in multiple dimensions. Particularly, the devices described herein may be piezoelectric devices capable of detecting or generating forces in multiple axes. The devices may be used singly or incorporated into systems for monitoring or controlling an apparatus.

Figure 1A:
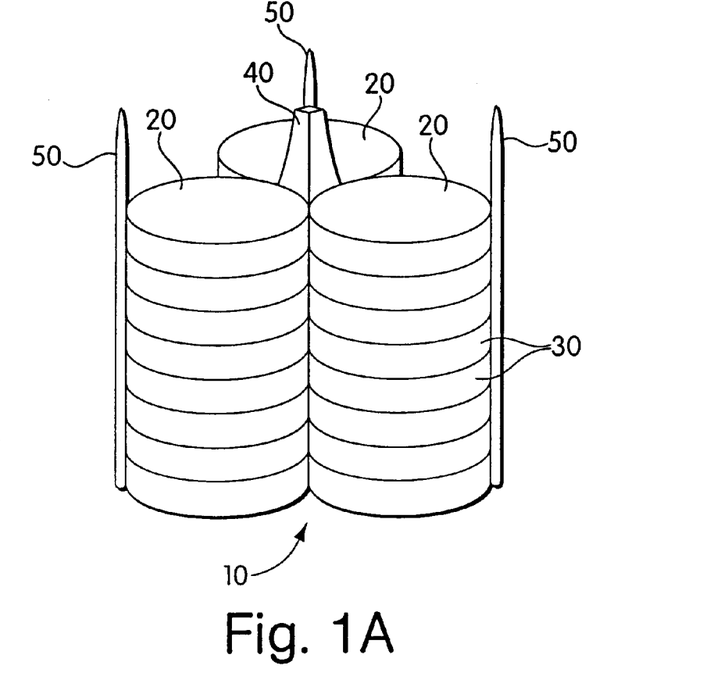
FIG. 1 illustrates a three-dimensional multi-purpose sensor and actuator.

The device 10 depicted in FIG. 1A comprises three stacks 20 of piezoelectric layers 30. Each stack has a separate stack electrode 50 electrically coupled with the layers 30 of that stack. Force vectors applied to the device may be transmitted to the stacks 20 differently, e.g., stacks closer to the origin of the force may receive a greater portion of the force, allowing the vector to be reconstructed in three dimensions by measuring differences in electrical potential between a common ground 40 and the stack electrodes 50. The common ground 40 may be electrically coupled to layers 30 of the stacks 20. In certain embodiments, the common ground 40 may be electrically coupled to layers 30 which are not electrically coupled to stack electrodes 50. For example, the common ground 40 and the stack electrodes 50 may be coupled to alternating layers 30.

A device 10 may be circular, quadrangular, square, triangular, X- or Y-shaped, or any other shape desired. The stacks 20 may be arranged in any geometrical relationship, and may be square, rectangular, triangular, circular, or any other shape, regular or irregular. The stacks 20 may be in contact with each other, or may be separated from each other. In one embodiment, the stacks are electrically insulated from each other. A device 10 for detecting forces in three dimensions may have at least three stacks 20, and a device 10 for detecting forces in two dimensions may have at least two stacks 20.

Any number of piezoelectric layers 30 may be present in stacks 20, e.g., one, or a plurality of layers. The stacks 20 may have equal numbers of layers 30, or the stacks 20 may have unequal numbers of layers 30. The layers may be in contact with each other, or may be separated by a material, such as electrically conductive material and/or a layer of electrically insulating material. The layers may be composed of any material which generates an electric signal when force is applied. In one embodiment, the stacks may be parallel to each other.

The piezoelectric layers 30 in each stack 20 may be electrically coupled, for example, in series, to a stack electrode 50, which may comprise any conductive material. The device may also include a common ground 40, which may serve as a reference for measuring the potentials of the stack electrodes 50. The common ground 40 may comprise any conductive material, e.g., an identical, similar, or different material than a stack electrode 50.

Figure 1B:
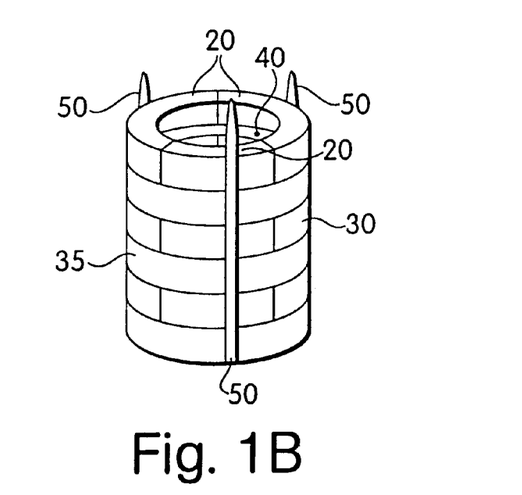
Figure 1C:
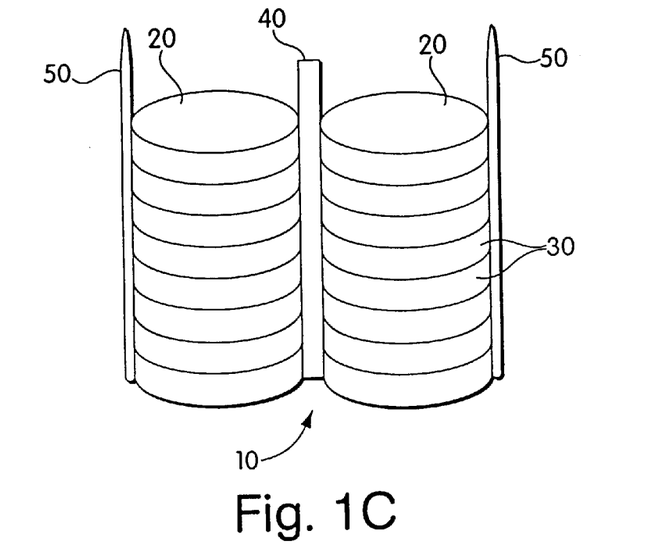
Figure 1D:
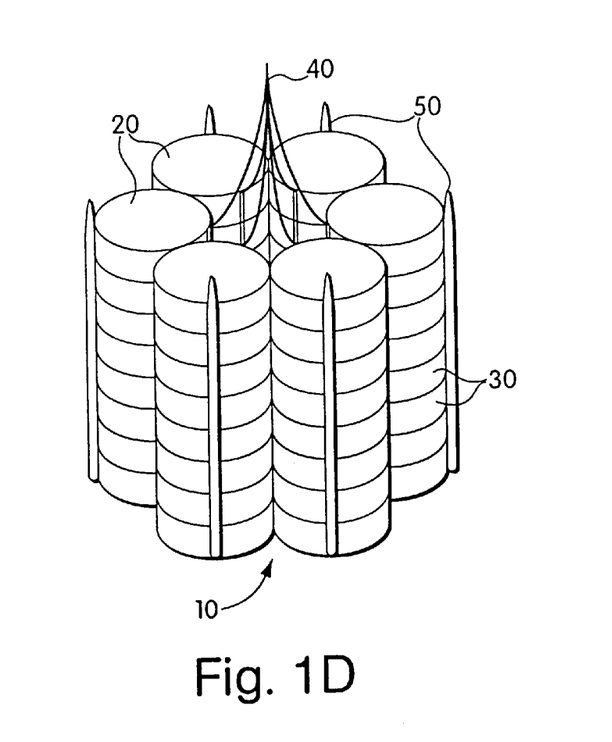
Figure 1E:
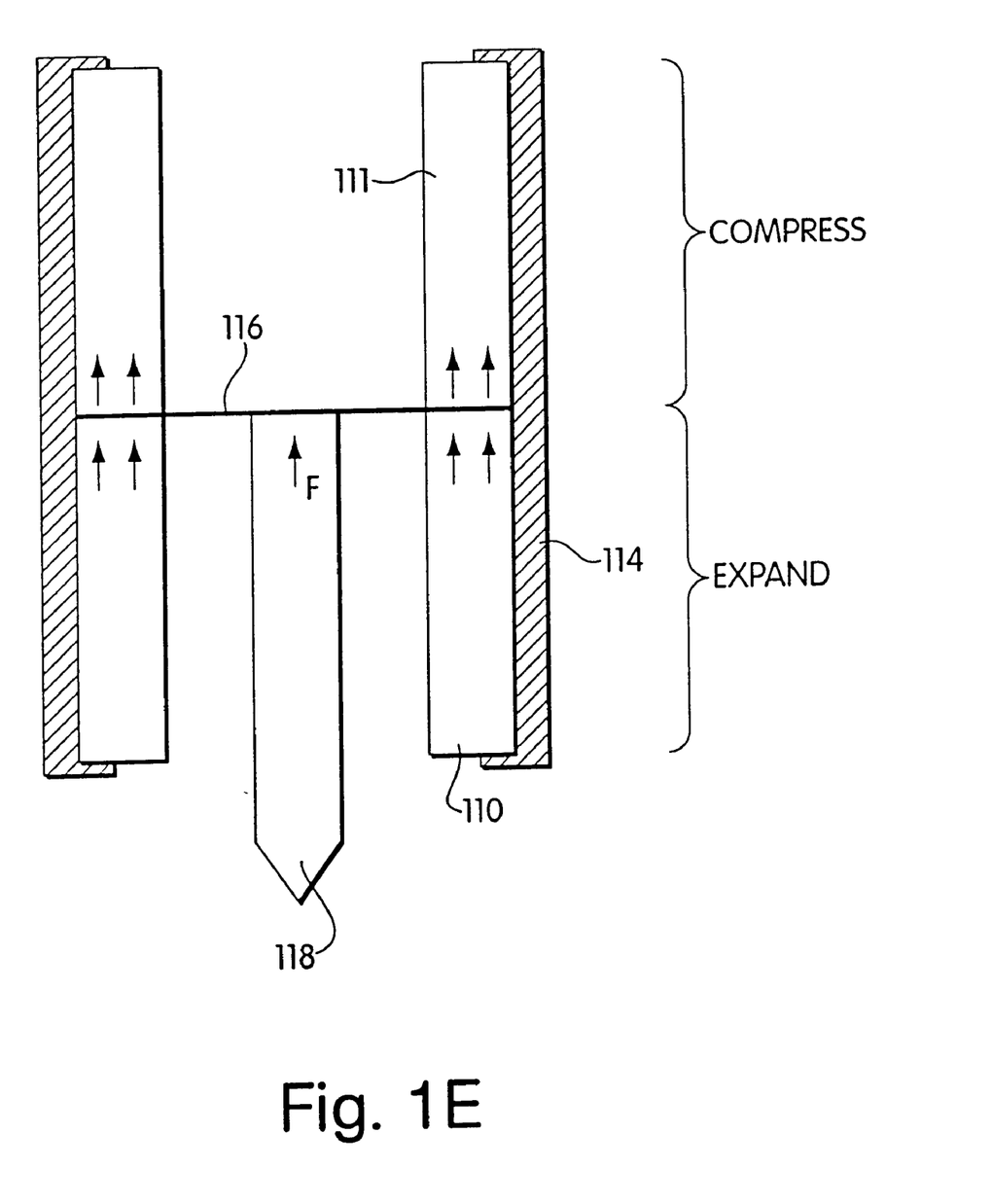

In one embodiment, as depicted in FIG. 1B, a device 10 may comprise alternating layers. One type of layer may be divided into three portions which form stacks 20 and may be electrically coupled to stack electrodes 50. Alternate layers 35 may be undivided or divided and may be electrically coupled to the common ground 40. The layers of the device 10 may be ordered in any fashion without materially affecting the operation of the device 10.

Figure 2:
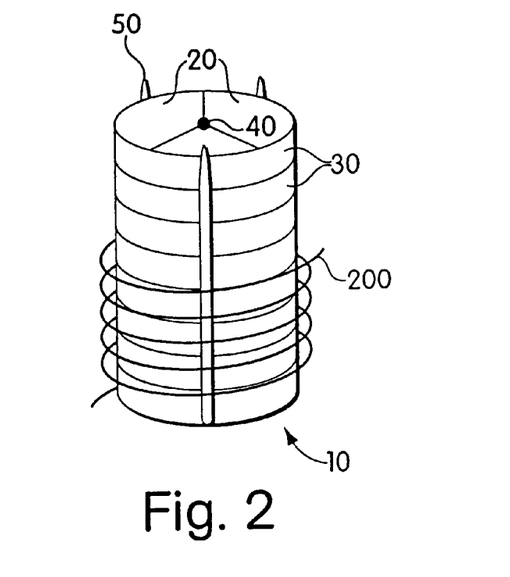
FIG. 2 illustrates a device with a resonance-causing electric or electronic circuit.

Although the device 10 depicted in FIG. 1 does not require external power to operate, the sensitivity and efficiency of a device 10 can be readily increased by supplying an external source of power. FIG. 2 depicts a device 10 encircled by a coil of electrically conductive material 200. A current, such as an alternating current, passed through the coil 200 may cause the piezoelectric layers of the device 10 to vibrate. When the alternating current feedback in the coil 200 reaches a frequency close to the eigen-frequency of the mechanical construction of the device 10, the device 10 resonates. When the feedback frequency reaches one-half the eigen-frequency, the output potentials between the stack electrodes 50 and the common ground 40 reach their maximum. This resonant embodiment of the invention may reach an efficiency of output amplitude between 20 and 100 times that of the non-resonant embodiment described earlier.

A device may be readily assembled by techniques known in the art. In one embodiment, at least two stacks having a plurality of piezoelectric layers may be provided. The layers of each stack may be electrically coupled to a stack electrode. The stacks may be placed parallel to each other on a surface, such that a force acting on the surface may generate an electric potential in the stacks, the potential being greater in stacks closer to the origin of the force. In one embodiment, three stacks may be provided. Each stack may be electrically insulated from other stacks. In one embodiment, some of the layers in each stack may be electrically coupled to a stack electrode, and other layers may be electrically coupled to a common ground. For example, layers coupled to the common ground may alternate with layers coupled to a stack electrode.

In another embodiment, a device may be assembled by providing a stack of piezoelectric layers. The layers may be divided into regions which are electrically insulated from the other regions. In certain embodiments, each layers may be divided into the same number of regions which are coaligned along the length of the stack. In certain embodiments, each layer is divided into three or more regions. Regions may then be electrically coupled to stack electrodes. In some embodiments, certain layers included in the stack may be electrically coupled to a common ground instead of to a stack electrode. For example, layers which are coupled to stack electrodes may alternate with layers coupled to the common ground. Layers coupled to the common ground may be divided, e.g., similarly to layers coupled to the stack electrode, or may be undivided.

A device as set forth above may be further coupled to a transceiver, or to a control unit coupled to a transceiver, to transmit data generated by the device to a processor for processing, or to receive commands from the processor.

Piezoelectric materials useful in device layers may comprise, for example, lead zirconate titanate (PZT system), lead titanate, lead zirconate, lead magnesium niobate (PMN system), lead nickel niobate (PNN system), lead magnesium tungstate, lead manganese niobate, lead antimony stannate, lead zinc niobate, lead magnesium tantalate, lead nickel tantalate, and composites of the foregoing materials.

Additionally, piezoelectric materials may include additives such as oxides or other compounds of, for example, lanthanum, barium, niobium, zinc, cerium, cadmium, chromium, cobalt, antimony, iron, yttrium, tantalum, tungsten, nickel, manganese, lithium, strontium, magnesium, calcium, and bismuth. For example, PLZT materials may be obtained by adding lanthanum oxide to the PZT system above. Exemplary composite materials include lead titanate and PMN, PBZT materials (obtained by adding barium to PZT materials), and materials composed of three components based on the PZT system (for example, materials containing lead magnesium niobate, lead zirconate, and lead titanate; lead nickel niobate, lead titanate, and lead zirconate; lead nickel niobate, lead magnesium niobate, and lead titanate; lead nickel tantalate, lead magnesium niobate, lead zirconate, and lead titanate; or lead magnesium tantalate, lead magnesium niobate, lead zirconate, and lead titanate. Furthermore, piezoelectric materials may be blended with organic polymers, as disclosed in U.S. Pat. No. 5,702,629 to Cui.

Many processes are known in the art for preparing piezoelectric materials. Such processes include conventional mixing of oxides, oxide sintering techniques such as taught by Bailey et al. (U.S. Pat. No. 5,527,480), molten salt synthesis such as disclosed by Arendt et al. (U.S. Pat. No. 4,152,281), and sol-gel processes such as disclosed by Woodhead et al. (U.S. Pat. No. 3,725,298). Piezoelectric materials useful in the devices disclosed herein may be made by these or any other processes known in the art.

Piezoelectric materials may generate heat during operation, and fluctuations in temperature may affect the relationship between signal magnitude and force magnitude. In certain embodiments, a temperature sensor may be included to allow correction of the signals generated by a device as the temperature changes. Also, thermal expansion may generate a signal similar to that generated by a force-induced expansion. This type of error may be corrected mechanically, e.g., by using two devices disposed in a way that causes the temperature-induced errors to cancel. For example, as shown cross-section in FIG. 1E, a pair of tubular devices 110 and 111 may be situated in a housing 114. Both devices may be coupled to a displaceable panel 116 separating the devices. Panel 116 may be coupled to the walls of the housing 114, e.g., operating as a flexible membrane, or may slide along the walls of the housing, e.g., operating as a plunger. When a force acts upon a rod 118 passing through device 110, panel 116 may compress device 111, generating a signal, and expand device 110, generating a signal of the opposite magnitude. The temperature-induced error of both devices 110 and 111, however, may be of the same magnitude. By combining the signals from the two devices 110 and 111, the temperature-induced error may be effectively cancelled, permitting a more accurate measurement of the force acting on rod 118.

Devices may be used to detect forces by detecting electric potentials from a device or cause forces by providing an electric potential to a device.

A device 10 placed on a surface may detect forces acting on that surface in three dimensions. Comparing the electric potentials between the common ground 40 and stack electrodes 30 permits the location of the force on the surface to be determined, because the potential of a stack close to the origin of a force will be greater than the potential of a stack farther from the force. The magnitude of the force may be determined from the magnitude of the potentials generated by the force. These measurements may be performed using standard circuitry as set forth in "Microelectronic Circuits", Sedra and Smith, Third Edition, 1991, or by any other means known in the art.

Figure 3:
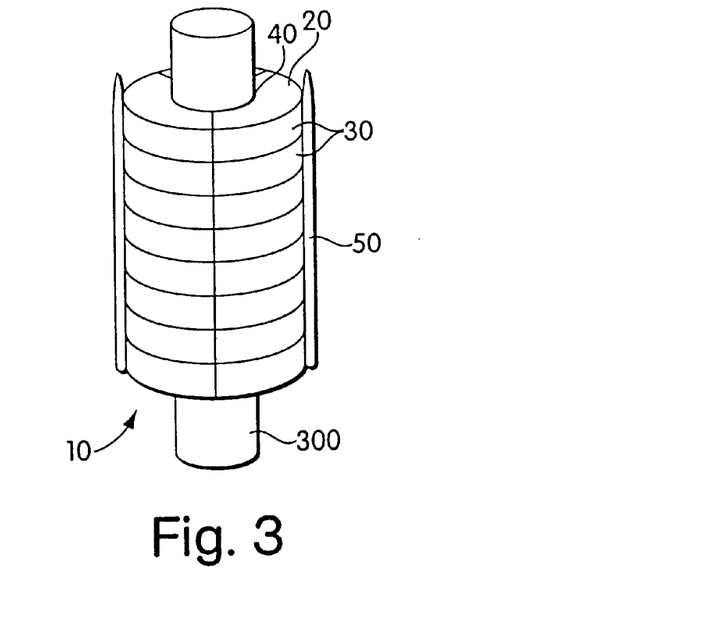
FIG. 3 illustrates a tri-axial force sensor.

A device 10 can be employed as a tri-axial force sensor. FIG. 3 depicts a device 10 attached to a rod 300. In this embodiment, the device 10 is shaped like a tube, through which the rod 300 passes. When the device is held in a fixed position, forces applied to the rod 300 may deform the device 10, causing changes in electric potential between the stack electrodes 50 and the common ground 40 as described above. The changes in electric potential of the stack electrodes 50 may be proportional to the forces applied to the rod 300, and may be used to reconstruct the forces in three dimensions relative to a reference frame. Although the rod passing through the device 10 depicted in FIG. 3 has a circular cross section, an object having a rectangular, triangular, square, or any other shape of cross section may be employed in a related embodiment.

Figure 4:
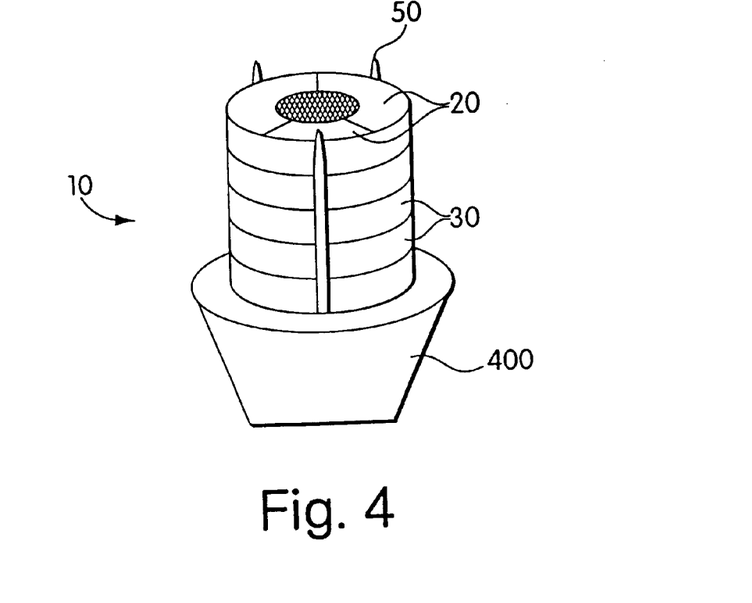
FIG. 4 illustrates a tri-axial accelerometer.
Figure 5:
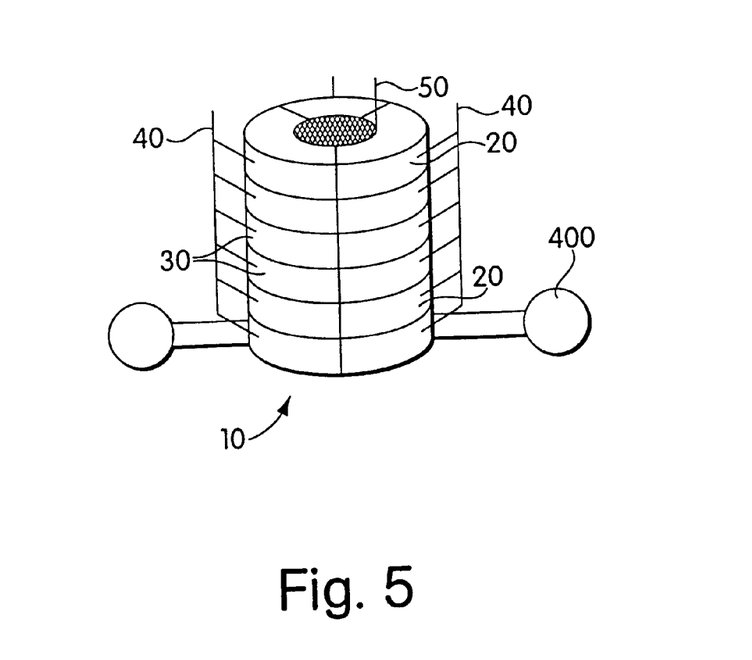
FIG. 5 illustrates a triangular sensor.

A device 10 can be used to measure accelerations by connecting the device 10 to an inertial mass 400 as shown in FIG. 4. FIG. 5 depicts an alternative embodiment of a device 10 to which an inertial mass 400 is attached. An inertial mass 400 may be of any shape, made of any material, and may be connected, directly or indirectly, to the device 10 by any means that permits the inertial mass 400 to exert a force on the stacks 20 of the device 10. In one embodiment, the inertial mass 400 may be connected to the device 10 and may not be supported by or connected to any other structure which supports the device 10. Deformations of device 10, caused by forces exerted on it by the motion of inertial mass 400, may cause changes in electric potential between the stack electrodes 50 and the common ground 40, as described above. The changes in electric potential of the stack electrodes 50 may be proportional to the forces applied to the stacks 20, and may be used to reconstruct the forces in three dimensions relative to a reference frame.

A device 10 coupled to an inertial mass 400 may also be useful for measuring the alignment of the device 10 relative to a gravitational field. The gravitational field, which can be considered an acceleration as discussed above, may attract the inertial mass 400, which in turn may exert a force on the device 10, causing changes in electric potential between the stack electrodes 50 and the common ground 40, as described above. The changes in electric potential of the stack electrodes 50 may be proportional to the forces applied to the stacks 20, and may be used to determine the alignment of the device 10 relative to the gravitational field.

Three angles may thus be reconstructed from signals generated by a device 10 attached to an inertial mass 400. Two angles, pitch and roll, may be measured in an absolute fashion from the effect of the gravitational field on the inertial mass 400 of the device as described above. The third angle, yaw, may be measured as an incremental or decremental change relative to the previous value of that angle. In the absence of a strong gravitational field, e.g., in space, angles may be determined in a relative fashion by measuring accelerations, as described above.

Figure 6:
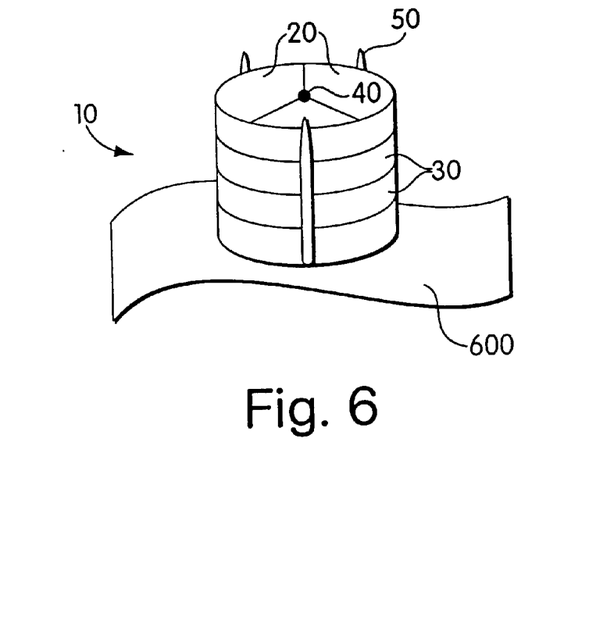
FIG. 6 illustrates an actuator.

As depicted in FIG. 6, a device 10 attached to a conformable surface 600 can be used as an actuator to exert a force on the surface 600. Because piezoelectric materials respond to an electric potential by a change in volume, a voltage applied to the device 10 may result in a distortion of the device 10. For example, changes in electric potential between the stack electrodes 50 and the common ground 40 as described above may cause deformations of device 10 which may be transferred to the surface, thereby changing the position of the surface. Because the device 10 may operate in three axes as described above, the position of the surface may be altered in three axes as well. The computation and the execution of the desired changes in the geometry of the conformable surface 600, proportional to deformations caused to the device 10 by changes in electric potential between the stack electrodes 50 and the common ground 40, may be performed by a processor which may communicate directly or indirectly with the device using either a wired or wireless connection.

The systems and methods disclosed herein provide devices which may be used substantially simultaneously as sensors and actuators. This dual functionality may be achieved, for example, by rapid alternation between modes, e.g., between detecting and applying potentials to the devices, or by including stacks dedicated to sensing and stacks dedicated to actuating. For example, the device shown in FIG. 1D may be used as a simultaneous sensor/actuator by dedicating three stacks to sensing and three stacks to actuating, for example, in an alternating relationship. Forces may be simultaneously exerted and detected in three dimensions using such a device. Furthermore, the three actuating stacks may be made of a material which operates optimally in an actuating mode, while the three sensing stacks may be made of a different material which operates optimally in a sensing mode, permitting enhanced operation over a device made of a single material which must operate suitably in both modes. Other means for integrating sensor and actuator function will be apparent to those of skill in the art and are encompassed by the scope of this disclosure.

This description of the invention is only illustrative. Modifications, such as for two- or three-axis actuator applications, may be made by those skilled in the art without departing from the spirit and scope of the invention. It will be understood that the embodiments of the invention which have been described are illustrative of some of the applications and principles of the present invention. Various modifications may be made by those skilled in the art without departing from the spirit and scope of the invention Systems including a plurality of devices are provided by the systems and methods disclosed herein for the accurate measurement of the dynamics of a system, whether complex or simple. In one embodiment, the device system permits simultaneous real-time measurement of forces along three reference axes (x, y, z), and in three angles (pitch, roll, yaw) relative to these axes, when the device system is in contact with a body or surface. When the contact is broken, the device will then measure accelerations along three reference axes (x, y, z), and in three angles (pitch, roll, and yaw) relative to these axes.

The systems and methods permit, through the coupling and alignment of devices to a body, reconstruction of the motion of that body. In certain embodiments, the systems include one or more devices, as described above, to measure forces or accelerations acting on an object. The device system may include a control unit to receive, process, or transmit data, or to control the devices in an actuating mode.

Algorithms to reconstruct motion of a body from the values of six parameters (three forces or accelerations and three angles) are well documented and known to people skilled in the art. Thus, when these values are known for a body, the methods of the present invention allow the reconstruction of the motion of this body in virtual three-dimensional space, in a two-dimensional plane, or along a single line.

For example, a device system may be installed in smart ammunition to measure the flight motion of the ammunition, transmit the flight data to a control and command computer, correct the trajectory as necessary, and initiate the detonation at impact. In another embodiment, a device system and a pen cartridge may be located in a housing, e.g., axially aligned, and cooperate to measure data, for example, which may be transmitted by a control unit to a computer for further processing or for reconstruction of the motion of the pen tip on a writing surface, thus generating an image of the writing as described in greater detail below.

In another embodiment, a system including a plurality of devices may be attached to a complex multi-body system, e.g., with at least one device attached to each component of the multi-body system. Thus, the forces and accelerations, in three dimensions and three angles, can be measured for each component of the multi-body system. A plurality of devices may be connected to a control unit, which may transfer data to and from a processor, as described above.

The data provided thereby may allow reconstruction of the motion of a complex multi-body system in virtual three-dimensional space, or in a two-dimensional plane, or along a single direction, by incorporating a device system, e.g., by coupling devices to component bodies into the multi-body system and by applying the methods of this invention as described above. Suitable algorithms for derivation of the position of the system, or of the projection of the object on a plane, line, or a single axis, as bitmaps of time-based snapshots or as still visualization of the system are well known in the art. The bitmaps can be framed and the frames can be visualized in series, thus allowing, e.g., through animation, visualization of the motion of the system, relative to the origin of a reference frame, in virtual three-dimensional space, a two-dimensional plane, or along a single directional axis, thereby reconstructing the motion of an object or system from data generated by a device system. These methods may be applied, for example, to the visualization of hand drawings and handwriting, e.g., signatures, in real time or in deferred mode.

In an exemplary embodiment, the systems and methods described herein permit reconstruction of the motion of the point of a stylus for the recognition of handwriting based on the information regarding the dynamics of the handwriting. Handwriting analysis is conventionally performed by analyzing a signature or other handwriting sample and comparing it to another signature or handwriting sample. Although the device systems described herein may permit reconstruction of a writing trace which can then be compared to another sample, the device systems may also measure kinetic information related to handwriting. Thus, in addition to the visual elements of a signature or handwriting sample, information such as pen speed, writing pressure, and writing angle can be measured and used to provide even more accurate authentication of a writer's identity. Additionally, changes in these variables, such as twisting or rotation of a pen during writing, can be detected and measured as they occur in different portions of a signature or other handwriting. In one embodiment of this object of the invention, handwriting may be recognized in real time as it is being written. In another embodiment, information regarding the dynamics of writing may be stored in a persistent storage medium and used for off-line deferred recognition of the handwriting. In another embodiment, persons may be identified or recognized through the dynamics of their writing, in particular their signature, in real time or deferred as described above.

Figure 7:
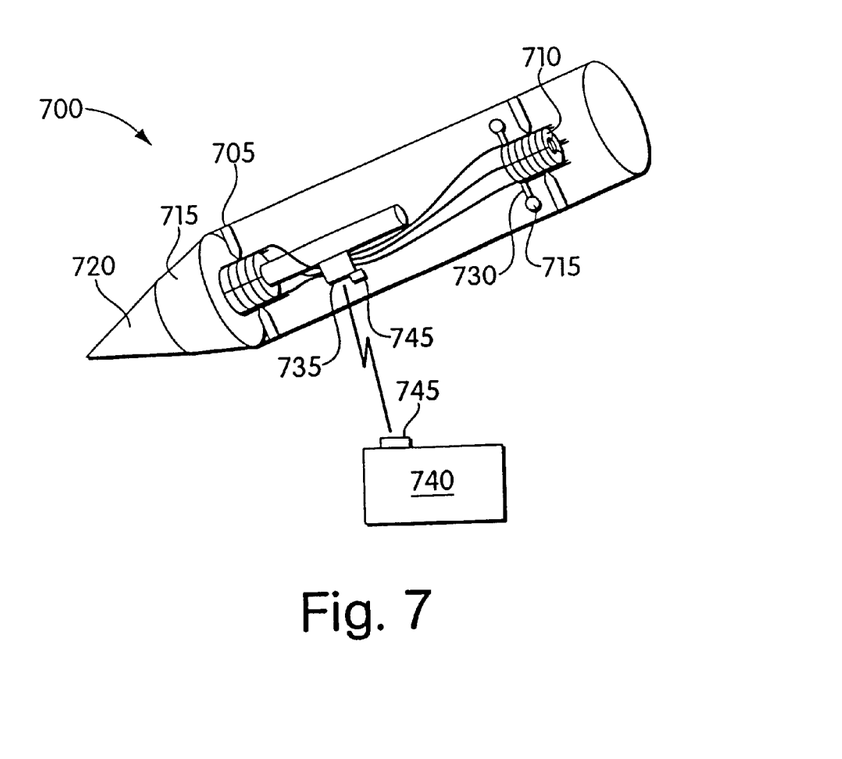
FIG. 7 depicts a device system mounted into a wireless pen.

As an exemplary embodiment, FIG. 7 depicts a device system incorporated into a stylus housing 702. The device system 700 may include an integrated force-, acceleration-, and contact-sensing portion 705 comprising an inertial mass 715 coupled to stylus tip 720 and a device 710 coupled to the housing. The device system may also include a tilt-sensing portion 730 consisting of an inertial mass 715 and a device 710 coupled to the housing 702. The two devices may transmit data to a control unit 735 that may encode/decode encrypted information in standard protocols and communicate with a processor 740, e.g., through a wire or a wireless data link. Transceivers 745 may be used to transmit data between the control unit 735 and the processor 740.

The force-sensing portion 705 may measure forces applied to the stylus tip 720, for example, during writing or contact with a surface, and the tilt-sensing portion 730 may measure forces related to the orientation of the stylus in a gravitational field. When the stylus tip 720 is not in contact with a surface, the device system 700 may detect the motion of the stylus by detecting accelerations applied to the stylus. Data from these measurements may permit reconstruction of the motion of the point of the stylus both when it is in contact with a surface and when it is above the surface.

In another exemplary application of a device system, the various components of a structure or apparatus, e.g., a permanent space station, aircraft, ship, train, or building, can be equipped with a device system, thus allowing the monitoring, control, and command of the components. Similarly, the systems and methods disclosed herein may be employed to maintain or control the position of any system, e.g., complex multi-body or single point, relative to the origin of a reference frame. For example, a device system may be incorporated into an airborne apparatus, such as an aircraft, projectile, rocket, or missile, to measure the separation of leading-edge vortices and adapt, using the devices as actuators, a conformable surface of the apparatus in flight without the help of large control computers, resulting in higher maneuverability, greater lift, and reduced aerodynamic drag.

Figure 8:
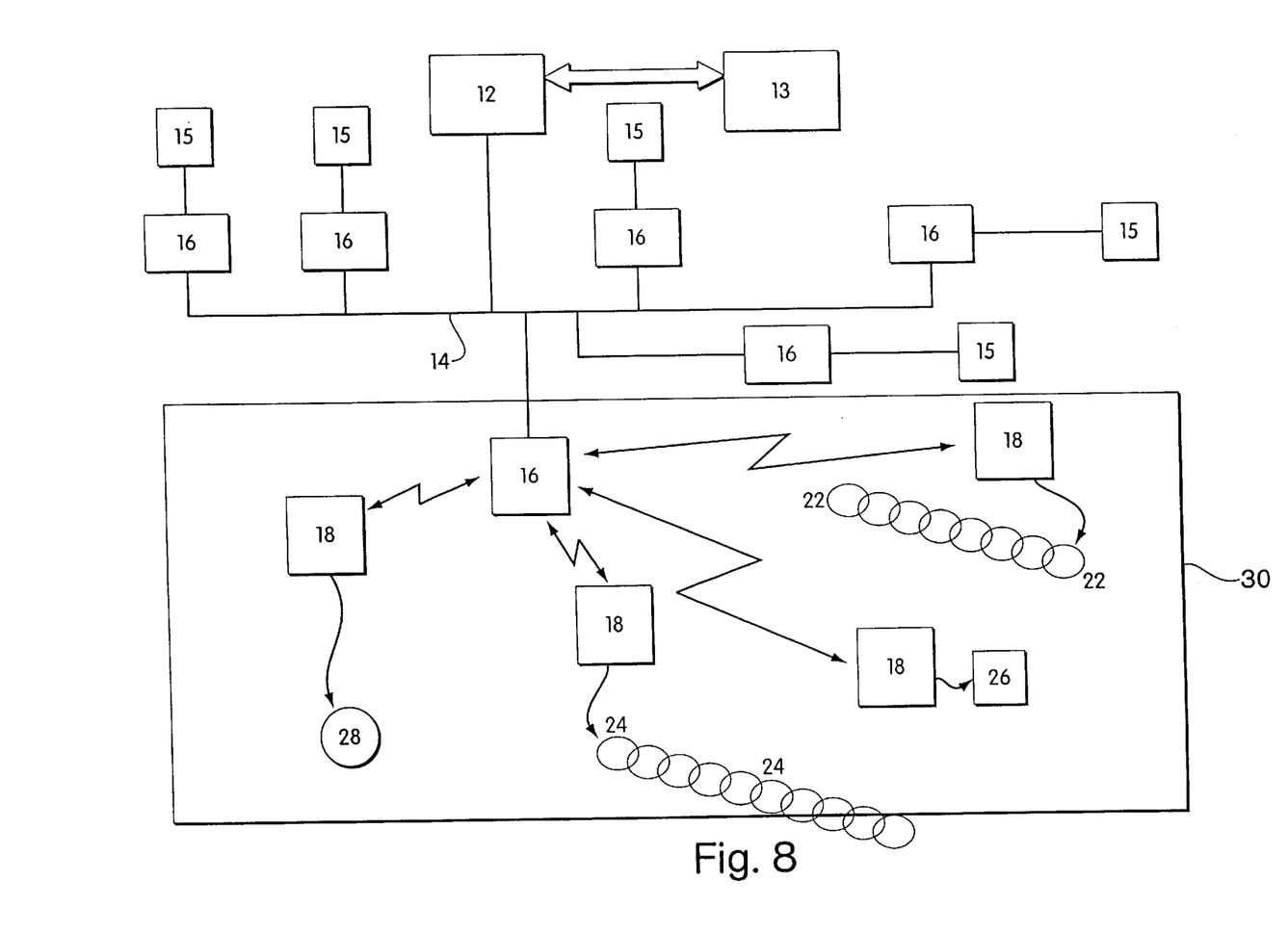
FIG. 8 illustrates a device system mounted into an aircraft.

FIG. 8 schematically depicts the incorporation of a device system 800 into a structure, e.g., an aircraft. The device system 800 may include a plurality of devices 15 and transceivers 16, coupled via a network bus 14 to a processor 12 with a screen 13. As discussed above, the processor 12 may process incoming data and respond to operator input. The system may also include a chamber 30 having a transceiver 16 and four control units 18. The chamber 30 is representative for any system, e.g., airborne or space, to be monitored and controlled. Via wired or wireless transmissions, the control units 18 may be coupled to a plurality of devices 22, each in turn connected to an element of the structure. For example, a control unit 18 may be coupled to a conformable surface element 28 that is part of the wing assembly of the aircraft. Similarly, other control units 18 may be coupled to other devices 24. A control unit 18 may be coupled to a plurality of elements (e.g., actuators, sensors, or instruments) which may be useful in a control system for dynamic change of aircraft geometry.

As described above, control units 18 may receive commands and provide data to a transceiver 16 via a data link such as a hardwired cable link. Optionally, an infrared or radio frequency wireless link can be employed. The transceiver 16 may exchange data and instructions with a processor 12 via a network 14 distributed through the aircraft.

Each control unit may receive data from the processor on how to drive, or interface with the devices coupled to that control unit. The control unit can use this information to collect information or to convey commands to the devices. Standard data formats and protocols may be used for exchange with the transceiver. The transceiver may format data into suitable protocols for exchange with the control unit and for transport over the network. Accordingly, the system may provide an airborne, light weight, miniaturized, low-power control system with a standard interface to its components.

Signals generated by a system as outlined above may be processed to reconstruct the forces and accelerations applied to the system for visualization or further analysis. The process generally may include an initialization portion, wherein the signals generated by the system are calibrated and corrected, a measuring portion, wherein signals are measured during operation of the system, and an analysis portion, wherein the signals are processed to reconstruct the forces an accelerations applied to the system during measurement. An exemplary processing scheme 900 useful in a system mounted in a stylus (as shown in FIG. 7) is presented in FIG. 9. The extension of this scheme to other systems of varying complexity may be readily determined by one of ordinary skill in the art.

Figure 9:
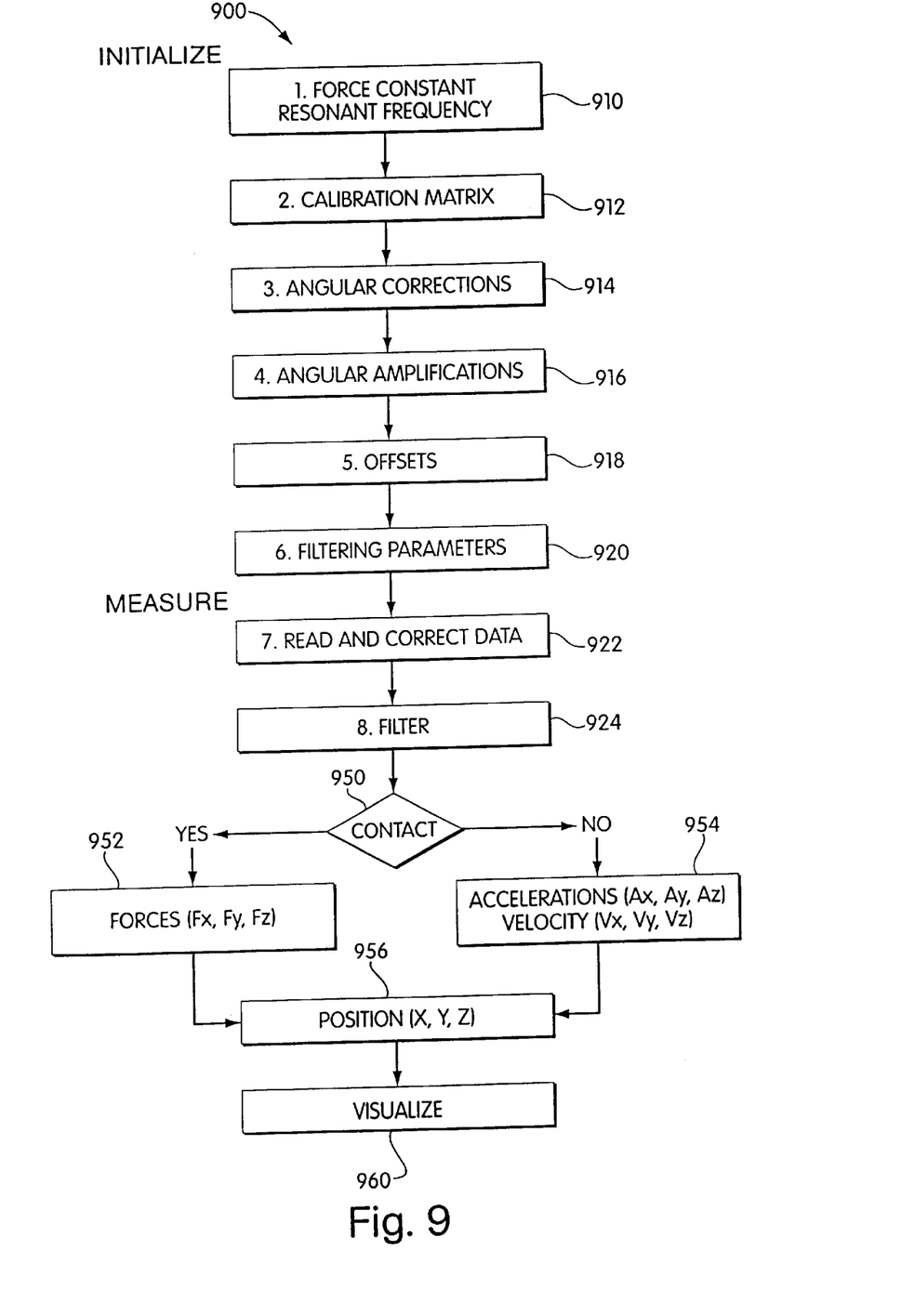
FIG. 9 describes the process flow of the methods that are part of the present invention.

The initialization sequence, as will be apparent to one of ordinary skill in the art, is intended to define characteristics and systematic errors of the system to allow more accurate measurements to take place. As shown in FIG. 9, an initialization sequence may include exemplary steps 910–920. Thus, an initialization sequence may include determining the force constants and resonant frequencies of the devices in the system, for example, by Fast Fourier Analysis. Determining the force constant and resonant frequency of a device is one method for determining response characteristics of a device; other means of performing this function will be apparent to one of ordinary skill in the art and may be substituted herefor. The calibration matrices of force/acceleration-sensing devices may be determined, and the angular corrections and amplifications of angle-sensing devices may also be measured. Determining a calibration matrix is useful for determining force/potential relationships for a device; other means of calibrating a device will be known to those of skill in the art and may be substituted for this procedure. Similarly, measuring the angular corrections and amplifications of angle-sensing devices serves as a method of calibrating an angle-sensing device; similar results may be obtained by other methods which are well known in the art. Offsets of the device with respect to a reference system may be determined, permitting the establishment of a spatial relationship between a device and its environment. A variety of methods for performing this function are known in the art. These various measurements may be taken in any order, including substantially simultaneously. Additionally, the filtering parameters may be set, whereby portions of data generated by the devices may be selected for further processing. Various procedures for performing this function are known in the art and may be used in the systems and methods disclosed herein.

The measurement portion of the sequence 900, including steps 922 and 924, relates to gathering signals generated by the system in response to forces exerted thereon. The signals may be corrected and filtered based on parameters calculated and/or set during the initiation sequence, or by applying other procedures selected to increase the accuracy of the measurements. The signals may be stored as raw data prior to processing, or may be processed on a continuous basis as measurements are taken.

The analysis steps of the sequence 900 may be chosen to convert the signals generated by the system into an interpretable form, such as a graphic display, digital readout, or other form of output. Processing of the signals may include comparing the signals to stored signals, representing the motion of an object in a virtual three-dimensional space, in a two-dimensional plane, or along a line, or monitoring the forces acting on the system. As shown in FIG. 9, a process for analyzing the signals generated by a system housed in a stylus may include steps 950–960. For example, the signals may be analyzed to determine whether the stylus is in contact with a surface. If contact is detected, the resulting signals may be interpreted as forces. If contact is not detected, the resulting signals may be interpreted as accelerations. Standard mathematical calculations applied to the force/acceleration signals and the angular signals can be used to determine the velocities caused by the forces or accelerations, and from this information, the position of the stylus can be determined for any point in time. A representative method for performing these calculations can be found in U.S. Pat. No. 5,548,092, incorporated herein by reference. An angular sensor may only detect angles in two dimensions relative to a gravitational field, but the third dimension may be calculated as an incremental or decremental change relative to the previous value of that angle based on additional data, such as measured accelerations. The results may then be displayed, e.g., on a computer screen or a printout, to provide a representation of the motion of the stylus.

A process such as that described above may be carried out by any processor, such as a computer system, for example, by executing a computer program written in a computer language, e.g., Fortran, C, Java, etc., or by any other means known to those of ordinary skill in the art. The data may be processed, in part or in its entirety, internally, e.g., within the pen housing, or may be transmitted to an external processor for analysis.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

We claim:

1. A sensor for detecting forces, comprising
    at least two piezoelectric stacks, each stack electrically coupled to a corresponding stack electrode, wherein a force applied to said at least two stacks generates a change in electrical potential between each of said stack electrodes and a common ground, which change is representative of at least two different axial components of the force acting on the corresponding stack,
    wherein each stack includes a first plurality of piezoelectric layers electrically coupled to the corresponding stack electrode, and a second plurality of piezoelectric layers electrically coupled to the common ground.

2. A sensor for detecting forces, comprising
    a first plurality of stacked piezoelectric layers, each layer divided into a number of regions, each region electrically insulated from other regions of the same layer and electrically coupled to like regions of other layers by a stack electrode,
    wherein a force applied to said first plurality of stack layers generates a change in electrical potential between each of said stack electrodes and a common ground, which change is representative of at least two different axial components of the force acting on the corresponding region.

3. The sensor of claim 2, further comprising a second plurality of stacked piezoelectric layers electrically coupled to the common ground and intermixed with the first plurality of stacked piezoelectric layers.

4. The sensor of claim 3, wherein the layers of the second plurality of stacked piezoelectric layers are divided into a number of regions.

5. The sensor of claim 3, wherein layers of the first plurality and of the second plurality alternate in series.

6. The sensor of claim 2, wherein the number of regions in the first plurality of stacked piezoelectric layers is three, whereby the sensor is capable of resolving forces in three dimensions.

7. The sensor of claim 2, wherein the layers are encircled by an electrically conductive wire.

8. The sensor of claim 2, wherein the layers are coupled to at least one inertial mass, whereby the sensor can detect accelerations in three dimensions.

9. A system for detecting forces, comprising a housing, two sensors disposed in the housing, each sensor comprising a plurality of stacked piezoelectric layers, each layer divided into a number of regions, each region electrically insulated from other regions of the same layer and electrically coupled to like regions of other layers by a stack electrode, and a divider disposed between the two sensors and coupled to each sensor, wherein a force applied to the divider compresses one sensor and expands the other sensor.

10. A system for detecting forces, comprising a sensor having a first plurality of stacked piezoelectric layers, each layer divided into a number of regions, each region electrically insulated from other regions of the same layer and electrically coupled to like regions of other layers by a stack electrode, and a second plurality of stacked piezoelectric layers intermixed with the first plurality of stacked piezoelectric layers, each layer electrically coupled to a common ground, and a transmitter, electrically coupled to the sensor, to transmit signals generated thereby, wherein a force applied to said first plurality of stack layers generates a change in electrical potential between each of said stack electrodes and a common ground, which change is representative of at least two different axial components of the force acting on the corresponding region.

11. The system of claim 10, further comprising a receiver to receive the signals from the transmitter, and a processor coupled to the receiver to process the signals.

12. The system of claim 10, wherein the signals are representative of the motion of the sensor along three axes.

13. A method for detecting forces, comprising providing a sensor having a first plurality of stacked piezoelectric layers, each layer divided into a number of regions, each region electrically insulated from other regions of the same layer and electrically coupled to like regions of other layers by a stack electrode, and a second plurality of stacked piezoelectric layers intermixed with the first plurality of stacked piezoelectric layers, each layer electrically coupled to a common ground, and electrically coupling a transmitter to the sensor to transmit signals generated thereby, whereby a change in electrical potential between a stack electrode and the common ground is representative of a component of a force, and whereby the component of the force is detected along the at least two axes.

14. The method of claim 13, further comprising disposing the sensor on a surface.

15. The method of claim 13, further comprising providing a receiver to receive the signals from the transmitter, and coupling a processor to the receiver to process the signals.

* * * * *